US009416691B2

(12) United States Patent
Stucchi et al.

(10) Patent No.: US 9,416,691 B2
(45) Date of Patent: Aug. 16, 2016

(54) INTERNAL-COMBUSTION ENGINE HAVING A SYSTEM FOR VARIABLE ACTUATION OF THE INTAKE VALVES, PROVIDED WITH AN ELECTRICALLY ACTUATED VALVE HAVING TWO WAYS AND THREE POSITIONS

(71) Applicant: C.R.F. Societa Consortile per Azioni, Orbassano (Torino) (IT)

(72) Inventors: Sergio Stucchi, Valenzano (IT); Raffaele Ricco, Casamassima (IT); Onofrio De Michele, Castellana Grotte (IT); Marcello Gargano, Torre a Mare (IT); Carlo Mazzarella, Noicattaro (IT); Chiara Altamura, Taranto (IT)

(73) Assignee: C.R.F. SOCIETA CONSORTILE PER AZIONI, Orbassano (Torino) (IT)

( * ) Notice: Subject to any disclaimer, the term of this patent is extended or adjusted under 35 U.S.C. 154(b) by 116 days.

(21) Appl. No.: 14/334,955

(22) Filed: Jul. 18, 2014

(65) Prior Publication Data
US 2015/0034031 A1   Feb. 5, 2015

(30) Foreign Application Priority Data
Aug. 1, 2013   (EP) .................................... 13178883

(51) Int. Cl.
*F01L 9/02* (2006.01)
*F01L 13/00* (2006.01)
(Continued)

(52) U.S. Cl.
CPC ............... *F01L 13/0031* (2013.01); *F01L 1/14* (2013.01); *F01L 9/025* (2013.01); *F16K 31/0655* (2013.01); *F01L 2001/3443* (2013.01)

(58) Field of Classification Search
CPC ........... F16K 31/0624; F01L 2760/004; F01L 13/065; F01L 13/06; F01L 13/00; F01L 2013/001; F01L 1/25; F01L 2800/06; F01L 2001/34446; F01L 1/245; F01L 2001/2444; F01L 1/24; F01L 2001/3443; F01L 1/267; F01L 13/0005; F01L 9/025; F01L 9/023; F01L 9/021
See application file for complete search history.

(56) References Cited

U.S. PATENT DOCUMENTS 8,851,118 B2 * 10/2014 Stucchi ................... B60T 8/364
                                                    137/625.64
9,175,630 B2 * 11/2015 Stucchi ................... F02D 43/04
(Continued)

FOREIGN PATENT DOCUMENTS

DE     102009012688 B3    7/2010
EP        0803642 A1     10/1997
(Continued)

OTHER PUBLICATIONS

European Search Report for corresponding European Application No. 13178883.8, dated Jan. 14, 2014 completed Jan. 13, 2014.

*Primary Examiner* — Thomas Denion
*Assistant Examiner* — Daniel Bernstein
(74) *Attorney, Agent, or Firm* — Heslin Rothenberg Farley & Mesiti P.C.; Victor A. Cardona, Esq.

(57) ABSTRACT

An internal-combustion engine includes a system for variable actuation of intake valves, including a control valve for each cylinder, which controls communication of a pressurized-fluid chamber with a discharge channel. The control valve has at least three different positions, namely, a first completely open position, a second partially open position, and a third completely closed position. Electronic control means are programmed for keeping the control valve in its closed position in operating stages in which the intake valve must remain coupled to the respective cam and for bringing the control valve from its completely closed position to its partially open position or to its completely open position in operating stages in which the intake valve must be uncoupled from the respective cam, selection between the first position and said second position of the control valve being made as a function of one or more operating parameters of the engine.

14 Claims, 9 Drawing Sheets

(51) Int. Cl.
*F01L 1/14* (2006.01)
*F16K 31/06* (2006.01)
*F01L 1/344* (2006.01)

(56) References Cited

U.S. PATENT DOCUMENTS

2014/0346258 A1\* 11/2014 Stucchi ................. F16K 31/008 239/583
2015/0034031 A1\* 2/2015 Stucchi ..................... F01L 1/14 123/90.12
2015/0034193 A1\* 2/2015 Stucchi ............... F16K 11/0716 137/625.69

FOREIGN PATENT DOCUMENTS

| | | | |
|---|---|---|---|
| EP | 1508676 | A2 | 2/2005 |
| EP | 1555398 | A1 | 7/2005 |
| EP | 1674673 | A1 | 6/2006 |
| EP | 1726790 | A1 | 11/2006 |
| EP | 2017439 | A1 | 1/2009 |
| EP | 2261471 | A1 | 12/2010 |
| EP | 2511489 | A1 | 10/2012 |
| WO | 9830787 | | 7/1998 |

\* cited by examiner

A.

B.

C.

INTERNAL-COMBUSTION ENGINE HAVING A SYSTEM FOR VARIABLE ACTUATION OF THE INTAKE VALVES, PROVIDED WITH AN ELECTRICALLY ACTUATED VALVE HAVING TWO WAYS AND THREE POSITIONS

CROSS REFERENCE TO RELATED APPLICATIONS

This application claims priority from European Patent Application No. 13178883.8 filed on Aug. 1, 2013, the entire disclosure of which is incorporated herein by reference.

FIELD OF THE INVENTION

The present invention relates to internal-combustion engines of the type comprising for each cylinder:
- a combustion chamber;
- at least one intake duct and at least one exhaust duct opening into said combustion chamber;
- at least one intake valve and at least one exhaust valve associated to said intake and exhaust ducts and provided with respective return springs that push them towards a closed position; and
- a camshaft for actuating the intake valves, by means of respective tappets, wherein said at least one intake valve is governed by the respective tappet against the action of the aforesaid return spring by interposition of hydraulic means including a pressurized-fluid chamber, facing which is a pumping plunger connected to the tappet of the valve, said pressurized-fluid chamber being adapted to communicate with the chamber of a hydraulic actuator associated to said at least one intake valve;
- a single, electrically actuated, control valve for each cylinder, adapted to set in communication said pressurized-fluid chamber with a discharge channel in order to uncouple said at least one intake valve from the respective tappet and cause rapid closing of said at least one intake valve by action of the respective return spring; and
- electronic control means, for controlling said electrically actuated control valve so as to vary the instant of opening and/or the instant of closing and the lift of each intake valve as a function of one or more operating parameters of the engine.

An engine of the above type is disclosed, for example, in any of documents EP 0 803 642 B1, EP 1 555 398, EP 1 508 676 B1, EP 1 674 673 B1 and EP 2 261 471 A1, all filed in the name of the present applicant.

PRIOR ART

The applicant has been developing for some time internal-combustion engines comprising a system for variable actuation of the intake valves of the type indicated above, marketed under the trade name "MULTIAIR". The applicant is the owner of various patents and patent applications related to engines provided with a system of the type specified above.

FIG. 1 of the annexed drawings shows a cross-sectional view of an engine provided with the "MULTIAIR" system, as described in European Patent EP 0 803 642 B1.

With reference to FIG. 1, the engine illustrated therein is a multicylinder engine, for example an in-line, four-cylinder engine, comprising a cylinder head 1. The cylinder head 1 comprises, for each cylinder, a cavity 2 formed by the base surface 3 of the cylinder head 1, defining the combustion chamber, into which two intake ducts 4, 5 and two exhaust ducts open. The communication of the two intake ducts 4, 5 with the combustion chamber 2 is controlled by two intake valves 7, of the conventional mushroom-shaped type, each comprising a stem 8 slidably mounted in the body of the cylinder head 1.

Each valve 7 is recalled into its closing position by springs 9 set between an internal surface of the cylinder head 1 and an end valve retainer 10. Communication of the two exhaust ducts 6 with the combustion chamber is controlled by two valves 70, which are also of the conventional type, to which springs 9 are associated recalling the valve towards its closed position.

Opening of each intake valve 7 is controlled, in the way that will be described in what follows, by a camshaft 11 rotatably mounted about an axis 12 within supports of the cylinder head 1, and comprising a plurality of cams 14 for actuation of the intake valves 7.

Each cam 14 that controls an intake valve 7 co-operates with the plate 15 of a tappet 16 slidably mounted along an axis 17, which, in the case of the example illustrated in the prior document cited, is set substantially at 90° with respect to the axis of the valve 7. The plate 15 is recalled against the cam 14 by a spring associated thereto. The tappet 16 constitutes a pumping plunger slidably mounted within a bushing 18 carried by a body 19 of a pre-assembled unit 20, which incorporates all the electrical and hydraulic devices associated to actuation of the intake valves, according to what is described in detail in what follows.

The pumping plunger 16 is able to transmit a thrust to the stem 8 of the valve 7 so as to cause opening of the latter against the action of the spring means 9, by means of pressurized fluid (preferably oil coming from the engine-lubrication circuit) present in a pressure chamber C facing which is the pumping plunger 16, and by means of a plunger 21 slidably mounted in a cylindrical body constituted by a bushing 22, which is also carried by the body 19 of the subassembly 20.

Once again in the known solution illustrated in FIG. 1, the pressurized-fluid chamber C associated to each intake valve 7 can be set in communication with a discharge channel 23 via a solenoid valve 24. The solenoid valve 24, which can be of any known type, suitable for the function illustrated herein, is controlled by electronic control means, designated schematically by 25, as a function of signals S indicating operating parameters of the engine, such as the position of the accelerator and the engine r.p.m.

When the solenoid valve 24 is open, the chamber C enters into communication with the channel 23 so that the pressurized fluid present in the chamber C flows in said channel, and a decoupling is obtained of the cam 14 and of the respective tappet 16 from the intake valve 7, which thus returns rapidly into its closing position under the action of the return springs 9. By controlling the communication between the chamber C and the discharge channel 23, it is consequently possible to vary as desired the time and stroke of opening of each intake valve 7.

The discharge channels 23 of the various solenoid valves 24 all give out into one and the same longitudinal channel 26 communicating with pressure accumulators 27, only one of which is visible in FIG. 1.

All the tappets 16 with the associated bushings 18, the plungers 21 with the associated bushings 22, the solenoid valves 24 and the corresponding channels 23, 26 are carried and constituted by the aforesaid body 19 of the pre-assembled unit 20, to the advantage of rapidity and ease of assembly of the engine.

The exhaust valves 70 associated to each cylinder are controlled, in the embodiment illustrated in FIG. 1, in a conventional way, by a respective camshaft 28, via respective tappets 29, even though in principle there is not excluded, in the case of the prior document cited, an application of the hydraulic-actuation system also to control of the exhaust valves.

Once again with reference to FIG. 1, the variable-volume chamber defined inside the bushing 22 and facing the plunger 21 (which in FIG. 1 is illustrated in its condition of minimum volume, given that the plunger 21 is in its top end-of-displacement position) communicates with the pressurized-fluid chamber C via an opening 30 made in an end wall of the bushing 22. This opening 30 is engaged by an end nose 31 of the plunger 21 in such a way as to provide hydraulic braking of the movement of the valve 7 in the closing stage, when the valve is close to the closing position, in so far as the oil present in the variable-volume chamber is forced to flow in the pressurized-fluid chamber C passing through the clearance existing between the end nose 31 and the wall of the opening 30 engaged thereby. In addition to the communication constituted by the opening 30, the pressurized-fluid chamber C and the variable-volume chamber of the plunger 21 communicate with one another via internal passages made in the body of the plunger 21 and controlled by a non-return valve 32, which enables passage of fluid only from the pressurized chamber C to the variable-volume chamber of the plunger 21.

During normal operation of the known engine illustrated in FIG. 1, when the solenoid valve 24 excludes communication of the pressurized-fluid chamber C with the discharge channel 23, the oil present in said chamber transmits the movement of the pumping plunger 16, imparted by the cam 14, to the plunger 21 that governs opening of the valve 7. In the initial stage of the movement of opening of the valve, the fluid coming from the chamber C reaches the variable-volume chamber of the plunger 21 passing through the non-return valve 32 and further passages that set the internal cavity of the plunger 21, which has a tubular conformation, in communication with the variable-volume chamber. After a first displacement of the plunger 21, the nose 31 exists from the opening 30 so that the fluid coming from the chamber C can pass directly into the variable-volume chamber through the opening 30, which is now free.

In the opposite movement of closing of the valve, as has already been said, during the final stage the nose 31 enters the opening 30 causing hydraulic braking of the valve so as to prevent impact of the body of the valve against its seat, for example following upon an opening of the solenoid valve 24, which causes immediate return of the valve 7 into the closing position.

In the system described, when the solenoid valve 24 is activated, the valve of the engine follows the movement of the cam (full lift). An anticipated closing of the valve can be obtained by deactivating (opening) the solenoid valve 24 so as to empty out the hydraulic chamber and obtain closing of the valve of the engine under the action of the respective return springs. Likewise, a delayed opening of the valve can be obtained by delaying activation of the solenoid valve, whereas the combination of a delayed opening and an anticipated closing of the valve can be obtained by activation and deactivation of the solenoid valve during the thrust of the corresponding cam. According to an alternative strategy, in line with the teachings of the patent application EP 1 726 790 A1 filed by the present applicant, each intake valve can be controlled in a "multi-lift" mode, i.e., according to two or more repeated "subcycles" of opening and closing. In each subcycle, the intake valve opens and then closes completely. The electronic control unit is consequently able to obtain a variation of the instant of opening and/or of the instant of closing and/or of the lift of the intake valve, as a function of one or more operating parameters of the engine. This enables the maximum engine efficiency to be obtained, and the lowest fuel consumption, in every operating condition.

FIG. 2 of the annexed drawings corresponds to FIG. 6 of EP 1 674 673 and shows a diagram of the system for actuation of the two intake valves associated to each cylinder, in a conventional MULTIAIR system. This figure shows two intake valves 7 associated to one and the same cylinder of an internal-combustion engine, which are controlled by a single pumping plunger 16, which is in turn controlled by a single cam of the engine camshaft (not illustrated) acting against its plate 15. FIG. 2 does not illustrate the return springs 9 (see FIG. 1), which are associated to the valves 7 and tend to bring them back into the respective closing positions.

As may be seen, in the conventional system of FIG. 2, a single pumping plunger 16 controls the two valves 7 via a single pressure chamber C. Communication of pressure chamber C with discharge is controlled by a single solenoid valve 24 and which is in hydraulic communication with both of the variable-volume chambers C1, C2 facing the plungers 21 for control of the two valves. The system of FIG. 2 is able to operate in an efficient and reliable way above all in the case where the volumes of the hydraulic chambers are relatively small. This possibility is offered by the adoption of hydraulic tappets 400 on the outside of the bushings 22, according to what has already been illustrated in detail for example in document EP 1 674 673 B1, also filed by the present applicant. In this way, the bushings 22 can have an internal diameter that can be chosen as small as desired.

FIG. 3 of the annexed drawings is a diagrammatic representation of the system illustrated in FIG. 2, in which it is evident that both of the intake valves 7 associated to each cylinder of the engine have their actuators 21 permanently in communication with the pressure chamber C, which in turn can be isolated from or connected to the discharge channel 23 via the single solenoid valve 24.

The solution illustrated in FIGS. 2 and 3 enables obvious advantages from the standpoint of simplicity and economy of production, and from the standpoint of reduction of the overall dimensions, as compared to the solution illustrated, for example, in document EP 0 803 642 B1, which envisages two solenoid valves for controlling separately the two intake valves of each cylinder.

For the valve 24 it may be envisaged, instead of the solenoid actuator, any other type of electrically operated actuator, for example a piezoelectric actuator or an actuator of the magnetostrictive type. Preferred embodiments of valves of this type have formed the subject of European patent application EP 13168666.9, filed by the present applicant on May 22, 2013.

Technical Problem

In systems for variable actuation of engine intake valves according to the prior art described above, there is the problem of excessive noise of the system, in particular at partial loads of the engine, due to an excessive speed in the closing movement of the intake valves when these are uncoupled from the respective cam by connecting the pressurized chamber of the system to discharge. Notwithstanding the action of the hydraulic brake associated to the actuator of each intake valve, the noise generated upon impact of each intake valve against its seat remains excessive. Furthermore, a more or less important part of the noise generated may also be due to the displacement of air generated by the excessively fast movement of the intake valve.

OBJECT OF THE INVENTION

The object of the present invention is to propose an engine of the type referred to at the start of the present description that will be able to solve the problems referred to above and that in particular will be able to reduce substantially the noise of the system due to the closing movement of the intake valves when these are uncoupled from the respective control cams.

More in general, it is an object of the invention to provide an engine of the type specified above, wherein it is possible to modulate the speed of the closing movement of the intake valves when they are uncoupled from the respective control cam.

SUMMARY OF THE INVENTION

With a view to achieving the above object, the subject of the invention is an internal-combustion engine having the characteristics specified in Claim 1.

In the engine according to the invention, the electrically actuated control valve associated to each cylinder is a two-way valve having at least three different operating positions, and precisely a first operating position in which it is completely open, a second operating position in which it is only partially open, and a third operating position in which it is completely closed. The electronic control means are programmed for:
keeping said control valve in said third, completely closed, position in operating stages in which said at least one intake valve must remain coupled to the respective cam;
bringing said control valve from said third, completely closed, position to said second, partially open, position or to said first, completely open, position in operating stages in which said at least one intake valve is to be uncoupled from the respective cam.

Selection between the above first position and the above second position of the control valve is obtained as a function of one or more operating parameters of the engine. When the speed of closing of the intake valves after decoupling from the cam has to be relatively lower, the pressure chamber is emptied by bringing the control valve into its second, only partially open, position. When, instead, the speed of closing of the intake valves may be relatively higher, the pressure chamber is emptied by bringing the control valve into its first, completely open, position.

Consequently, in the stages in which the pressure chamber of the system is connected to the discharge for uncoupling the intake valves from the respective cams, the rate at which the pressure chamber is emptied of the working fluid may be higher or lower according to whether the control valve is brought into its completely open position or into the partially open position. It is thus possible, in particular, to select the partially open position in the conditions (for example, at partial engine loads) in which it is necessary to obtain a slower movement of closing of the intake valves so as to keep the noise of the system down to a minimum.

More in general, the present invention enables a movement of closing of the intake valves, after decoupling from the respective control cam, according to a speed that is adjustable.

Of course, where in the present description and in the ensuing claims it is mentioned that the control valve has at least three operating positions, this does not exclude the case where the control valve still has a completely closed position and a completely open position, but has then more than one intermediate position between said extreme positions.

For the purposes of the invention, any electrically actuated control valve that presents the characteristics outlined above may be used. However, preferably, the engine according to the invention makes use of a solenoid valve specifically designed for the aforesaid purposes and that forms also the subject, in its own right, of a copending patent application filed in the name of the present applicant.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION OF PREFERRED EMBODIMENTS

In FIGS. 4, 4A, 5 and 6, the references have a numbering that starts again from 1.

Figure 4:
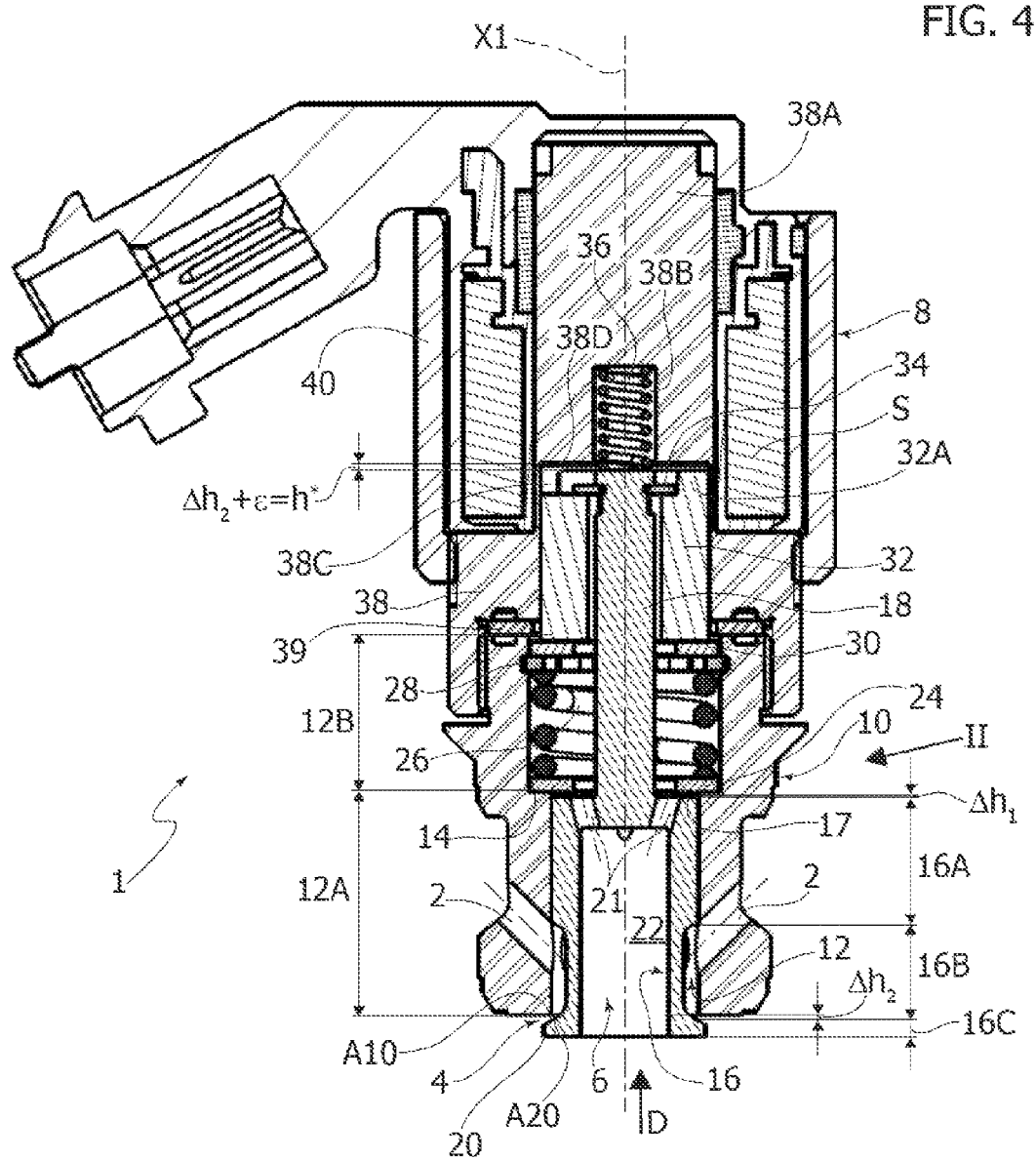
FIG. 4 is a cross-sectional view of an electrically actuated valve used in a preferred embodiment of the invention.

In FIG. 4, the reference number 1 designates as a whole an electrically actuated valve according to a preferred embodiment of the invention.

Figure 4A:
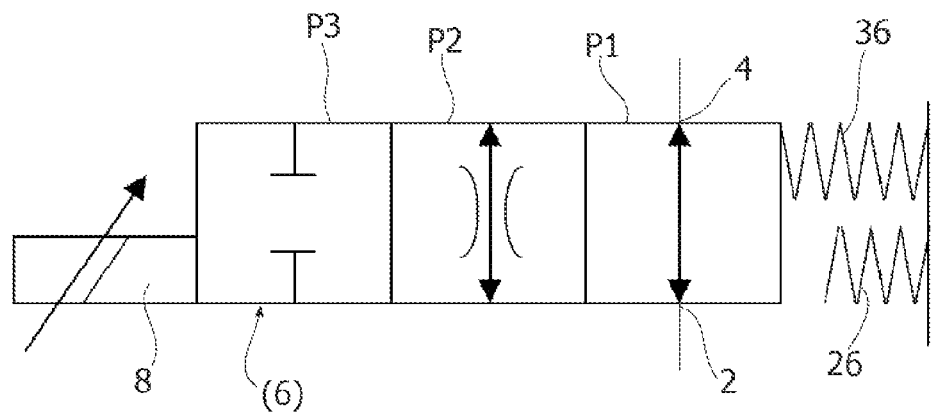
FIG. 4A is a schematic circuit representation of the valve of FIG. 4.

With reference to FIGS. 4 and 4A, the valve 1 includes a first operative port 2, a second operative port 4, an poppet element 6 configured for governing hydraulic communication between the ports 2 and 4, and an electromagnet 8 configured for actuation of the poppet element 6 along an axis X1 of the valve 1.

With reference to FIG. 4, the valve 1 includes a sleeve 10 having a substantially cylindrical tubular shape, provided on which are the operative ports 2, 4 and within which the poppet element 6 is mounted axially movable. In particular, the port 2 takes the form of a crown of radial holes having an axis incident on the axis X1 and inclined with respect thereto, whereas the port 4 is defined by the outlet of an axial through hole 12, which shares the axis X1 and includes a first section 12A having a diameter smaller than that of a second section 12B so as to define a shoulder 14 at the interface thereof.

The poppet element 6 includes a cylinder head 16 having a hollow cylindrical shape, and a shank 18 integral with the cylinder head 16 and having a diameter smaller than that of the latter in such a way as to define a shoulder 17 at the interface between them.

The cylinder head 16 further comprises three sections, namely:
- a first section 16A having a diameter substantially identical to the diameter of the section 12A of the hole 12;
- a second section 16B of diameter smaller than the diameter of the section 16A and defined substantially by an annular groove provided on the cylinder head 16 itself; and
- a third section 16C contiguous to the section 16B and having a diameter greater than the diameter of the section 12A of the hole 12, defined in particular by a terminal flange 20 that is shaped as a continuation of the walls of the annular groove dug on the cylinder head 16; the flange 20 further includes a conical sealing surface A20 configured for exerting a seal on a valve seat A10 defined by an edge on the outlet of the hole 12 on the sleeve 10, and corresponding to the position of the port 4.

Provided in the shoulder 17 is a crown of through holes 21 with axis incident on the axis X1 and inclined with respect thereto. The holes 21 give out onto a cavity 22 having a cylindrical shape provided within the cylinder head 16, thus setting it in communication with the section 12B of the hole 12.

Set bearing upon the shoulder 14 within the section 12B is a first spacer ring 24, upon which there in turn bears an elastic stop element 26, preferentially a cylindrical helical spring. Set at an opposite end of the elastic element 26, bearing thereupon, is a positioning retaining ring 28 (with prevalently radial deformability, preferably of a circlip type), which is axially fixed and upon which there in turn bears a second spacer ring 30. The thickness of the ring 24 enables adjustment of the axial pre-load of the elastic element 26.

Finally, bearing upon the spacer ring 30 is a movable core 32 of the electromagnet 8, which moreover bears upon a retaining ring 34 housed in a groove of the shank 18. The retaining ring 34 hence creates an axial constraint between the movable core 32 and the poppet element 6.

Bearing upon the end of the shank 18 is a further elastic stop element 36, preferentially a cylindrical helical spring having a coil diameter smaller than that of the elastic element 26. The elastic element 36 is housed in a seat made in a ring nut 38, in particular in a shank 38A thereof. Slidably set therein is the movable core 32, which surrounds the shank 18. In greater detail, in the embodiment illustrated herein, the elastic element 36 is housed in a terminal blind hole 38B of the aforesaid cavity, whereas the movable core 32 is slidably set in a section 38C that terminates in a shoulder 38D in a position corresponding to the hole 38B.

The ring nut 38 is screwed on the sleeve 10 where it gives out onto the outside of the section 12B of the hole 12. Set between the ring nut 38 and the sleeve 10 is a further spacer ring designated by the reference number 39 in FIG. 4.

A solenoid S of the electromagnet is moreover fitted around the shank 38A and is surrounded by a further ring nut 40 screwed on the ring nut 38. The ring nut 40 is made of a material with high ferromagnetic properties and completes the magnetic circuit of the electromagnet. All the components described above are mounted coaxially, sharing the axis X1.

Operation of the valve 1 is described in what follows.

Figure 5:
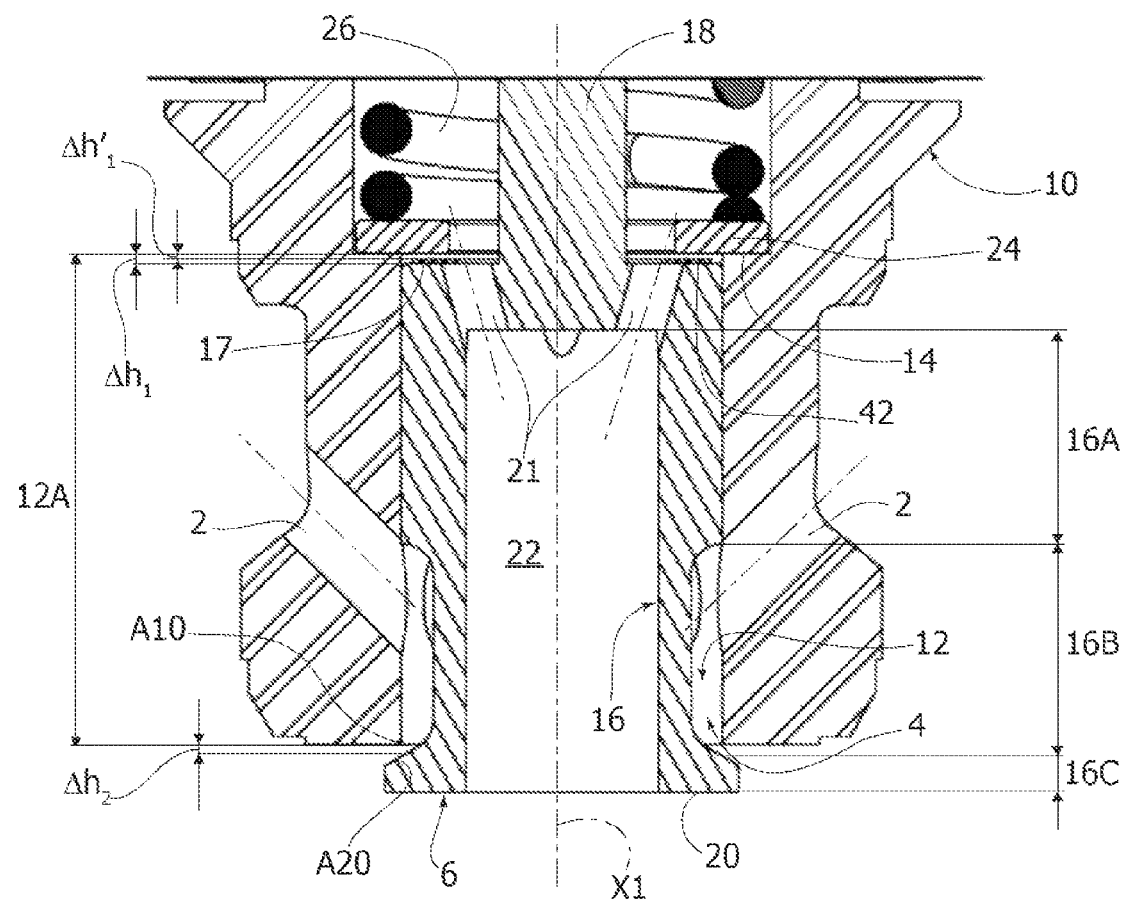
FIG. 5 is an enlarged cross-sectional view according to the arrow II of FIG. 4.

With reference to FIG. 4 and to FIG. 5, the poppet element 6 is prearranged for providing a seal via the conical surface A20 on the edge A10 that defines a valve seat set hydraulically between the first operative port 2 and the second operative port 4 and configured for governing hydraulic communication between them. The poppet element 6 can be moved via the electromagnet 8 and is able to assume a first operating position, a second operating position, and a third operating position.

In the ensuing functional description, the elastic element 36 will be identified as "first elastic element", whilst the elastic element 26 will be identified as "second elastic element".

The first operating position of the poppet element 6 is illustrated in FIGS. 4, 4A (schematically) and 5. The first operating position corresponds to a resting condition of the valve 1 and is characterized by the absence of electrical signal at input to the solenoid S. This implies the substantial absence of electromagnetic force on the movable core 32. In this way, the movable core 32 is kept bearing upon the ring 30 thanks to the action of the first elastic element 36 on the shank 18, which via the retaining ring 34 transfers said action onto the movable core 32. The retaining ring 28 affords a stop that the ring 30 cannot exceed, thus fixing the position of the poppet element 6 in the first operating position.

At the same time, the spacer ring 24 is kept bearing upon the shoulder 14 by the second elastic element 26. There moreover follows from this that each of the elastic elements 26, 36 is mounted so as to have a predetermined axial pre-load (i.e., it is mounted so as to have a non-zero deflection at rest).

In the first operating position, the position of the poppet element 6 with respect to the sleeve 10 is such that there is:
- a first axial play $\Delta h1$ (FIG. 5) between the cylinder head 16 (in particular, the shoulder 17) and the spacer ring 24; and
- a second axial play $\Delta h2$ (greater than $\Delta h1$) between the section 16C of the cylinder head 16, in particular the conical surface A20 and the sleeve 10, in particular the edge A10.

Thanks to this position of the poppet element 6, in the first operating position, the area of passage defined between the edge A10 and the conical surface A20 (which corresponds to the area of passage that the fluid that passes from the port 2 to the port 4, and vice versa, must traverse) has a maximum value.

Figure 1:
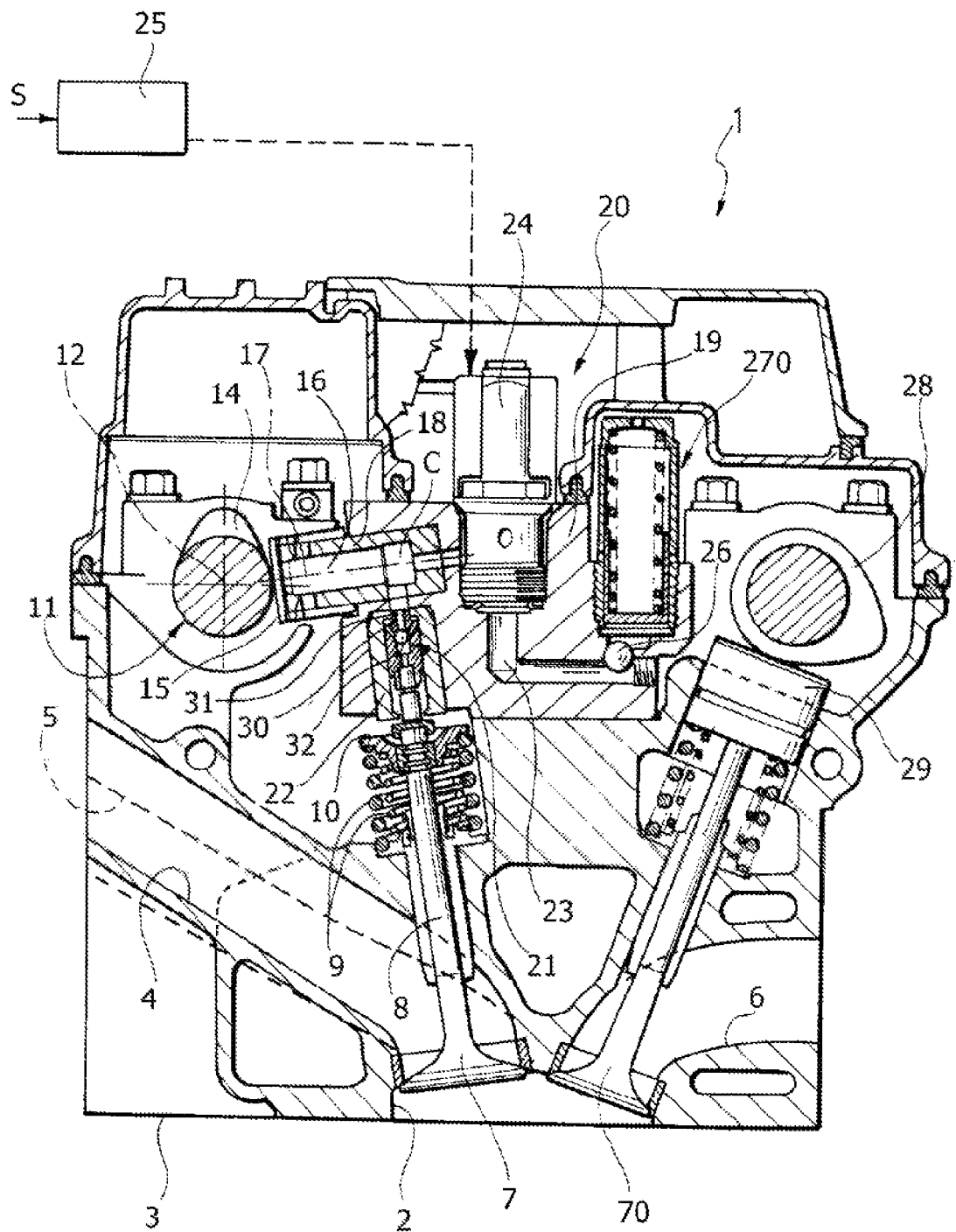
FIG. 1, which has already been described above, is a cross-sectional view of the cylinder head of an internal-combustion engine equipped with a Multiair system for variable actuation of the intake valves, according to what is illustrated in document EP 0 803 642 B1.
Figure 2:
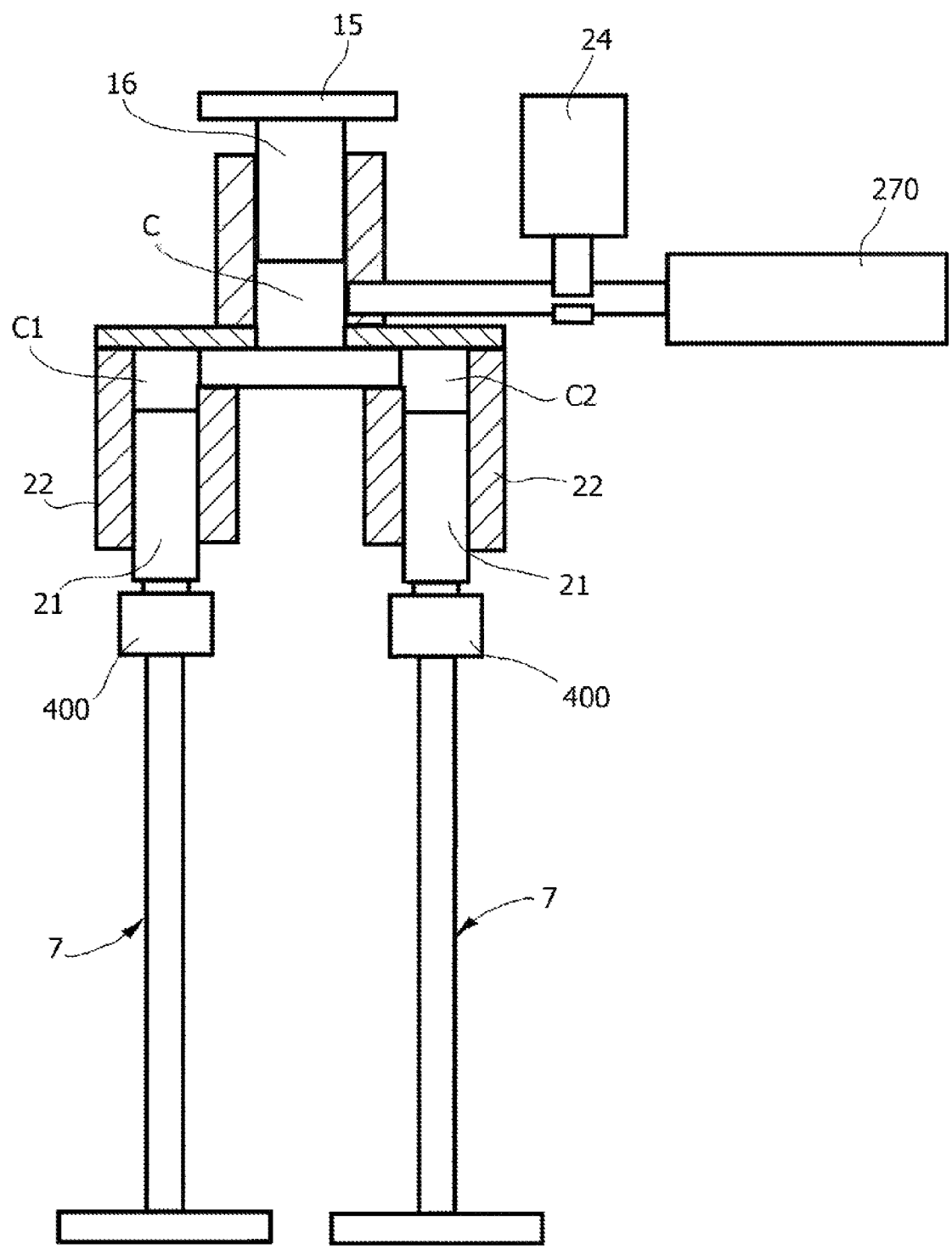
FIGS. 2 and 3, which have also already been described above, illustrate the system for governing two intake valves associated to one and the same cylinder of the engine, in a Multiair system of the conventional type, for example as described in document No. EP 2 261 471 A1.
Figure 3:
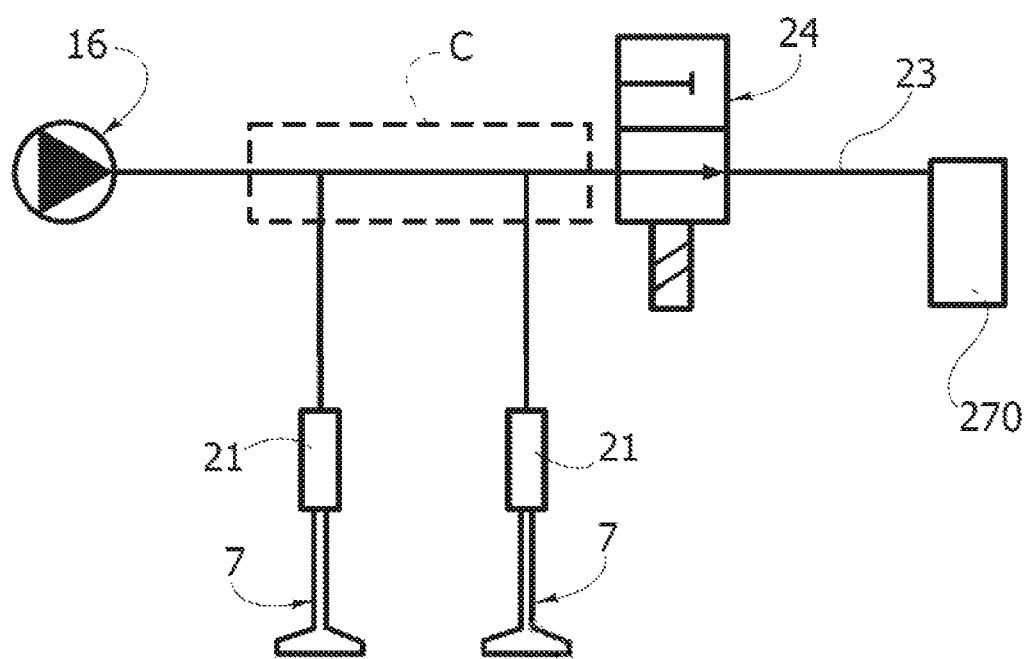

The poppet element 6 can be moved from the first operating position (illustrated in FIGS. 4, 4A, 2) to a second operating position by means of a first electrical command imparted on the electromagnet 8, in particular a current that is supplied to the solenoid S. This results in the development of an electromagnetic force that attracts the movable core 32, causing a displacement (by being drawn) of the poppet element 6 against the resisting action of the first elastic element 36, basically consisting of the axial pre-load assigned thereto (the proportional contribution due to deformation—given by the product of the stiffness by the deflection—has little impact considering how small the axial displacement of the end of the element 36 is). The transmission force in an axial direction is possible thanks to the retaining ring 34.

The value of current that is supplied to the solenoid S is such as to cause a displacement of the poppet element 6 along the axis X1 in a direction indicated by the arrow D in FIG. 4. This enables coverage of an axial displacement equal to $\Delta h1$ and makes it possible to bring the cylinder head 16 of the poppet element 6 to bear upon the spacer ring 24, thus annulling the axial play $\Delta h1$ existing in the valve 1. It should be noted that assignment of a predetermined axial pre-load to the elastic element 36 (the same applies to the second elastic element 26, as will be seen) enables unique determination of the value of the excitation current of the solenoid S, which is chosen so as to develop a force of attraction on the movable core 32 that will overcome the value of axial force corresponding to the aforesaid pre-load.

The axial displacement of the poppet element 6 stops against the spacer ring 24 in so far as the value of current supplied to the solenoid S is sufficient only to overcome the resisting action of the first elastic element 36 but is not able to overcome a resisting action by an amount equal to the sum of the contributions of elastic force (basically equal to the respective axial pre-loads) of the first and second elastic elements 36, 26. The continuation of the axial displacement of the poppet element 6 in the direction D would entail also the compression of the element 26, as will on the other hand be described shortly with regard to the transition from the second operating position to the third operating position of the poppet element 6.

It should be noted in fact that the two elastic elements, when they are both active in determining the mechanical equilibrium of the system, are set mechanically in parallel since they undergo the same deformation: the displacement of the shank 18 that compresses the element 36 is the same that the cylinder head 16 undergoes, the shoulder 17 of which draws the ring 24 within the section 12B of the hole 12 compressing the elastic element 26 (the other end of the element 26 is axially fixed in so far as it bears upon the retaining ring 28). In these circumstances, as is known, the equivalent stiffness of the ensemble of elastic elements is equal to the sum of the two contributions.

In the second operating position of the poppet element 6, the area of passage between the ports 2 and 4 is partialized and assumes a value lower than the maximum value. Basically, in the second operating position, a partialization of the area of passage between the ports 2 and 4 is introduced, with consequent modulation of the flow of fluid that passes from the port 2 to the port 4.

Transition from the second operating position to the third operating position of the poppet element 6 is obtained by imparting a second electrical command to the electromagnet 8 by means of supply to the solenoid S of a current of intensity higher than the current imparted in the transition from the first operating position to the second operating position.

This results in a force of attraction on the movable core 32 having an even greater magnitude and in particular such as to move further the poppet element 6 with respect to the position assumed at the end of the transition from the first operating position to the second operating position, overcoming the combined reaction (i.e., the sum of the two axial pre-loads) of the first and second elastic elements 36, 26. The cylinder head 16 of the poppet element 6 is hence able to draw the ring 24 axially, compressing the elastic element 26. The displacement of the poppet element 6 stops when the residual axial play between the flange 20 and the sleeve 10, which is equal to an amount $\Delta h2-\Delta h1$, is eliminated.

This is equivalent to bringing the conical surface A20 to bear upon the valve seat A10, which results in bringing the area of passage between the port 2 and the port 4 to a substantially zero value so that the first port 2 is isolated from the second port 4, and vice versa (there is in fact allowed a passage of fluid in both directions within the valve 1).

Also in this case, assignment of a predetermined axial pre-load to the second elastic element 26 enables a unique choice of the value of the excitation current that it is necessary to impart on the solenoid S to move the poppet element from the second operating position to the third operating position.

Figure 6:
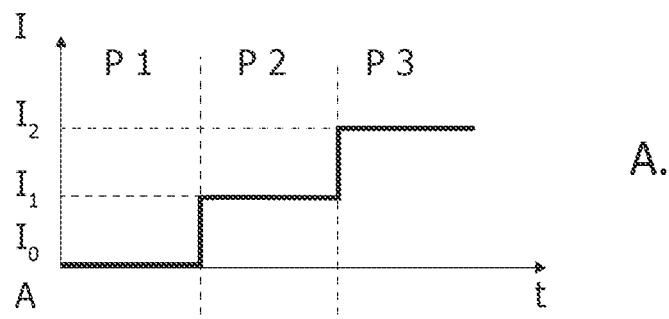
FIG. 6 is made up of a section A, a section B, and a section C, each illustrating a time plot, respectively, of a current for actuation of the valve of FIG. 1, an area of passage between the ports of the valve of FIG. 1, and a displacement of an poppet element of the valve.
Figure 6:
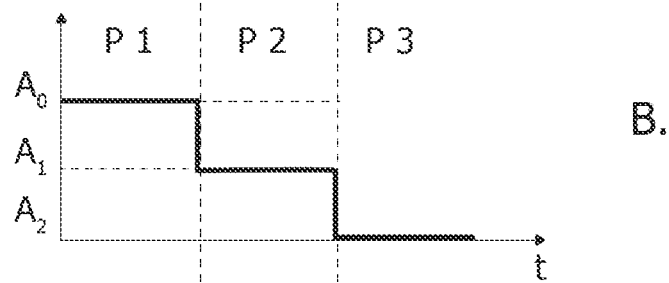
Figure 6:
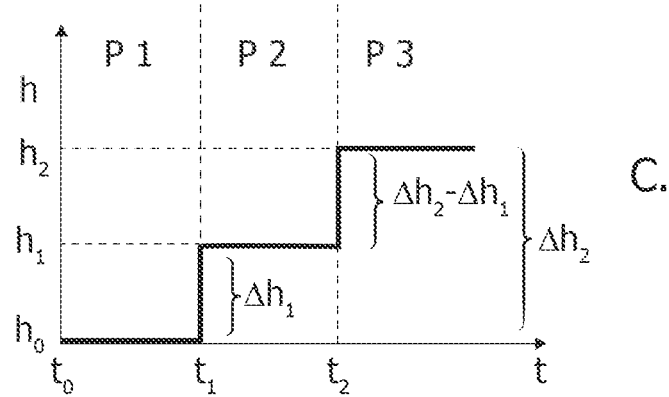

A summary of the variation of the conditions of the valve 1 that occur in the transition between the various operating positions 6 is provided by FIG. 6; namely:

the diagram of FIG. 6A illustrates the time plot of the current supplied to the solenoid S (excitation current); the current (on the ordinates) is designated by the symbol I, the time (on the abscissae) by the symbol t;

the diagram of FIG. 6B illustrates the time plot of the area of passage between the ports 2 and 4; the area (on the ordinates) is designated by the symbol A, the time (on the abscissae) by the symbol t;

the diagram of FIG. 6C illustrates the time plot of the axial displacement of the poppet element 6; the displacement (on the ordinates) is designated by the symbol h, the time (on the abscissae) by the symbol t.

All the diagrams have the same zero-time reference so that the evolution described by each of them is simultaneous with the evolution described by the other two.

The axis of the abscissae is divided into three intervals P1, P2, P3, associated, respectively, to the first operating position, to the second operating position, and to the third operating position of the poppet element 6. This being said, from the diagrams of FIG. 6, the following may be noted:

i) in the time interval P1, the poppet element is in the first operating position so that the excitation current of the solenoid S assumes a zero value I0, the area of passage between the ports 2 and 4 assumes a maximum value A0, and the axial displacement of the poppet element 6 has a zero value h0 (defining in this way the position reference for the poppet element 6);

ii) in the interval P2, the poppet element 6 is in the second operating position: the excitation current of the solenoid S assumes a value I1 other than zero and consequently greater than the value I0, the area of passage between the ports 2 and 4 drops to the value A1, lower than the value A0, whilst the axial displacement covered by the poppet element 6 (during transition from the first operating position to the second operating position) is equal to h1 (which is in turn equal to the amount $\Delta h1$);

iii) in the interval P3, the poppet element 6 is in the third operating position: the excitation current of the solenoid S assumes a value I2 greater than the value I1, the area of passage between the ports 2 and 4 goes to zero assuming the zero value A0, whilst the axial displacement covered by the poppet element 6 during the transition from the first operating position to the second operating position is equal to the amount $\Delta h2-\Delta h1$; the overall displacement covered by the poppet element 6 in the transition from the first operating position to the third operating position is hence equal to the value h2 (which is in turn equal to the amount $\Delta h2$).

In this connection, further brief considerations are called for regarding the relative positioning of the various components of the valve 1.

The axial play $\Delta h2$ is established, once the dimensions of the poppet element 6 and of the movable core 32 are fixed, by means of the spacer ring 30: this bears upon the retaining ring 28, which is axially fixed and consequently affords a position reference. The thickness of the ring 30 hence determines the position of the flange 20 with respect to the sleeve 10: in fact, it determines in the first place the distance of the movable core 32 with respect to the retaining ring 28, and given the axial constraint existing between the movable core 32 and the shank 18, this will also determine the position of the poppet element 6 with respect to the ring 28. Since moreover the latter is axially fixed with respect to the sleeve 10, it is evident that determining the position of the poppet element 6 with respect to the retaining ring 28 is equivalent to determining also the position thereof with respect to the sleeve 10, i.e., in the final analysis, the play Δh2 (maximum displacement of the poppet element 6).

The axial play Δh1 is instead established by means of the geometry of the poppet element 6, in particular the axial length of the cylinder head 16 and the axial distance of the groove where the ring 34 is housed with respect to the shoulder 17. The axial play Δh1 determines the amount of partialization of the section of passage between the ports 2 and 4 that is obtained in the transition from the first operating position to the second operating position. It should moreover be noted, with reference to FIG. 5, that the axial play Δh1 can undergo fine adjustment—if the requirements of the application so impose—to bring it to values smaller than those determined in the design stage by addition of a ring with calibrated thickness, designated by the reference number 42, thus bringing it to the value Δh1'<Δh1.

Finally, the spacer ring 39 enables adjustment of a further axial play, designated by the reference Δh*, equal to the sum of the play Δh2 and of an additional amount ϵ that enables compensation of the effects due to the machining tolerances. The axial play Δh* corresponds to the maximum displacement of the movable core 32 and is measured between the top end of the movable core 32 (as viewed in the drawing in FIG. 4; in any case, it is the end of the movable core 32 not in contact with the ring 30 and—in this embodiment—provided with a crescent-shaped axial projection designated by the reference number 32A) and the shoulder 38D. The thickness of the ring 39 determines the distance of the shoulder 38D from the margin (the top one—end of the section 12B—and the bottom one—edge A10) of the sleeve 10 and must be chosen so as to result in a play Δh*>Δh2 in so far as it is necessary for the movable core 32 to be able to cover an axial displacement greater than that of the poppet element 6. In fact, if the maximum axial displacements of the poppet element 6 and of the movable core 32 were chosen identical, there could arise situations of incomplete closing of the valve 1. For example, on the hypothesis of identical nominal maximum axial displacements, in the case where the machining tolerances on the head of the poppet element 6 were to result in a play Δh2 greater than the nominal one, in the presence, instead, of a play between the movable core 32 and the shoulder 38D equal to the nominal value, the movable core 32 would come into contact with the shoulder 38 long before there were created a contact between the surface A20 and the edge A10, which would prevent closing of the valve 1.

Instead, the choice of a value of the amount ϵ such as to cover the entire range of deviations with respect to the nominal values of the dimensions of the components established in the design stage makes it possible to bring the valve 1 to close in any condition.

It should moreover be noted that, during operation, the pressure of the hydraulic fluid across the valve 1, i.e., the one the pressure that is exerted on the port 2 and on the port 4, has no substantial effect on the movement of the poppet element 6.

The reason for this is that, thanks to the holes 21, there always exists the same value of pressure upstream and downstream of the cylinder head 16: the holes 21 create a shortcircuit between the environment on which the port 4 gives out and the section 12B of the hole 12. Also the volume where the shank 18 of the poppet element 6 terminates, defined between the top of the movable core 32 and the shoulder 38D of the ring nut 38 is in fluid communication with the portion 12B by means of appropriate areas of passage for the fluid defined by the radial play between the shank 18 and the movable core 32. In other words, the poppet element 6 is hydraulically balanced along the axis X1: this guarantees that the movement of the poppet element 6 depends only upon the value of excitation current supplied to the solenoid S.

The term "hydraulically balanced" referred to the poppet element 6 is intended to indicate that the resultant in an axial direction (i.e., along the axis X1) of the forces of pressure acting on the poppet element is zero. This is due to the choice of the surfaces of influence, exerted on which is the action of the pressurized fluid, and of the diameter of dynamic seal (in this case, also guide diameters) of the poppet element 6.

In particular, the diameter of dynamic seal of the poppet element 6 is the diameter of the section 12A, which is identical to the diameter of the cylinder head 16 at the shoulder 17, which moreover corresponds to the diameter on which the conical surface A20 provides the seal on the valve seat A10.

Of course, the details of construction and the embodiments may vary widely with respect to what has been described and illustrated herein, without thereby departing from the scope of the present invention, as defined by the annexed claims.

In particular, as anticipated, in alternative embodiments the electromagnet 8 may be replaced by a piezoelectric linear actuator or by a magnetostrictive linear actuator, both of which may be controlled electrically.

In the preferred embodiment forming the subject of the figures, the poppet element 6 is countered in its movement along the axis X1 by a first elastic element and a second elastic element having stiffnesses preferentially different from one another. However, the two elastic elements 26, 36 may be sized so as to have identical stiffnesses, which, on the hypothesis of an electromagnet with linear behaviour, would enable amplitudes of current I2 and I1 to be obtained, where one is twice the other.

Of course, it possible to choose the stiffnesses in a different way, for example the stiffness of the element 26 greater than the stiffness of the element 36, or vice versa.

In other embodiments, it is possible to replace the ensemble of the two elastic elements with a single equivalent elastic element having a nonlinear characteristic. This would be equivalent to sizing the single elastic element so that a deformation thereof from the condition at rest equal to Δh1 is characterized by a first value of stiffness to deformation, whereas a subsequent deformation of amplitude Δh2-Δh1 is characterized by a stiffness to deformation greater than the first stiffness so as to reproduce equivalently the mechanical parallel of the elastic elements 26, 36 that characterizes the valve 1.

Figure 7:
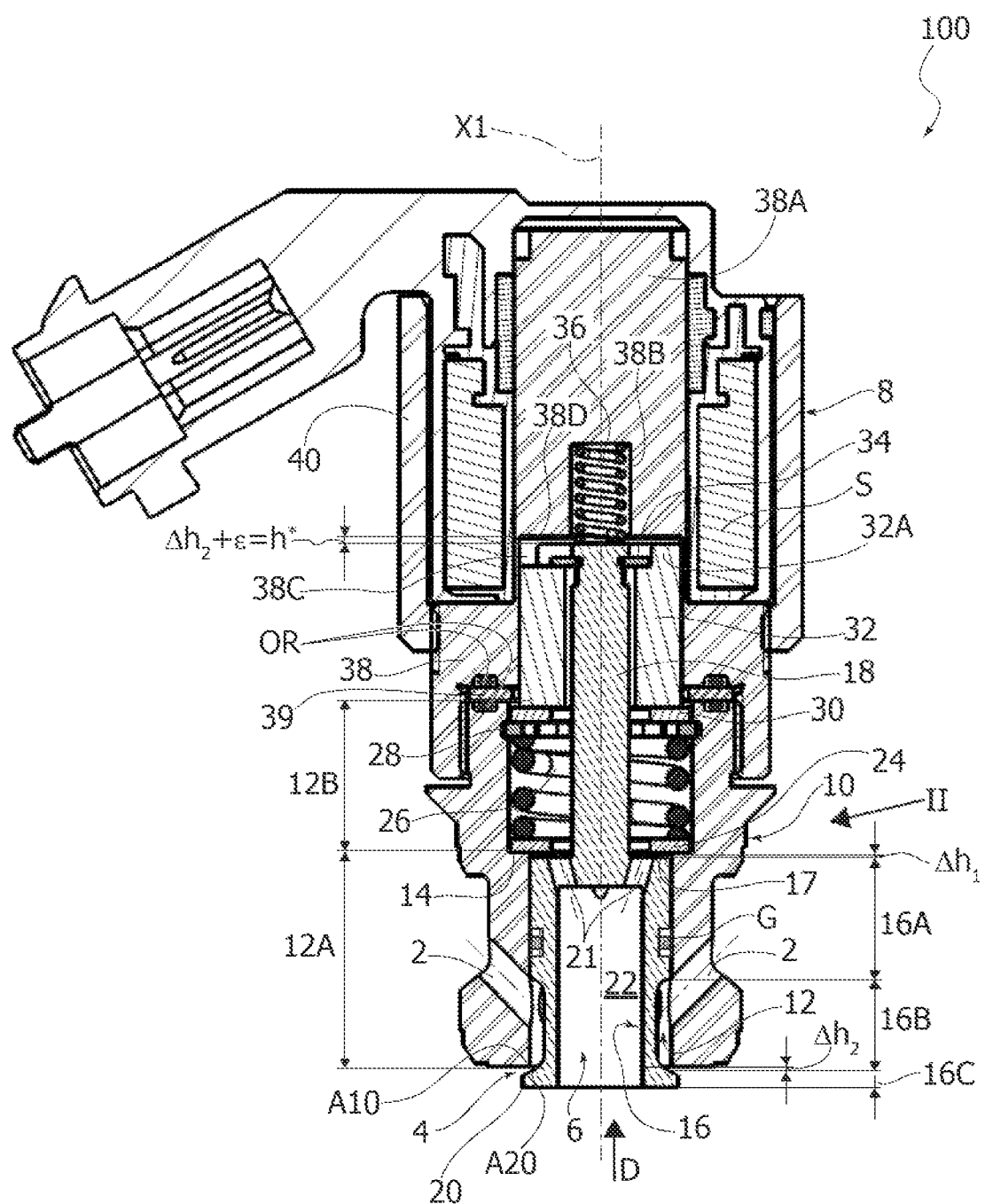
FIG. 7 illustrates a variant of the valve of FIG. 4, in particular devised for use with gaseous fluids.

With reference to FIG. 7, a variant of the valve of FIG. 4 is designated by the reference number 100. All the components identical to those already described are designated by the same reference numbers. The valve 100 is altogether identical to the valve 1, except for the provision of a pair of elastomeric annular gaskets of the O-ring type designated by the reference OR straddling the spacer ring 39 (one in the ring nut 38, and the other in the sleeve 10) and of a low-friction annular gasket G (made of PTFE—Teflon® or Turcite) on the cylinder head 16 of the poppet element 6, which provides a dynamic seal between the poppet element 6 and the sleeve 10.

Provision of the gaskets referred to above enables use of the valve 100 with a gaseous working fluid. This is not generally practicable with the valve 1 since, in the absence of the gaskets OR and G, there would arise leakage of gas that would jeopardize proper operation of the system. In the valve 1—which is devised specifically for operation with a working fluid in the liquid state—the seals are of a dynamic type and are created by the gaps of liquid in the radial plays between poppet element 6 and the sleeve 10 (basically along the section 12A). Any possible leakage of liquid at the interface between the ring nut 39 and the sleeve 10 in the valve 1 may be simply sent on to a draining environment, a thing that is not practicable if the working fluid is a gas. For the rest, operation of the valve 100 is altogether identical to that of the valve 1. It is in any case understood that the variant illustrated in FIG. 7 may be used also with liquid working fluids, specifically in the case where any possible leakage (consumption) of the working fluid is undesirable.

Figure 8:
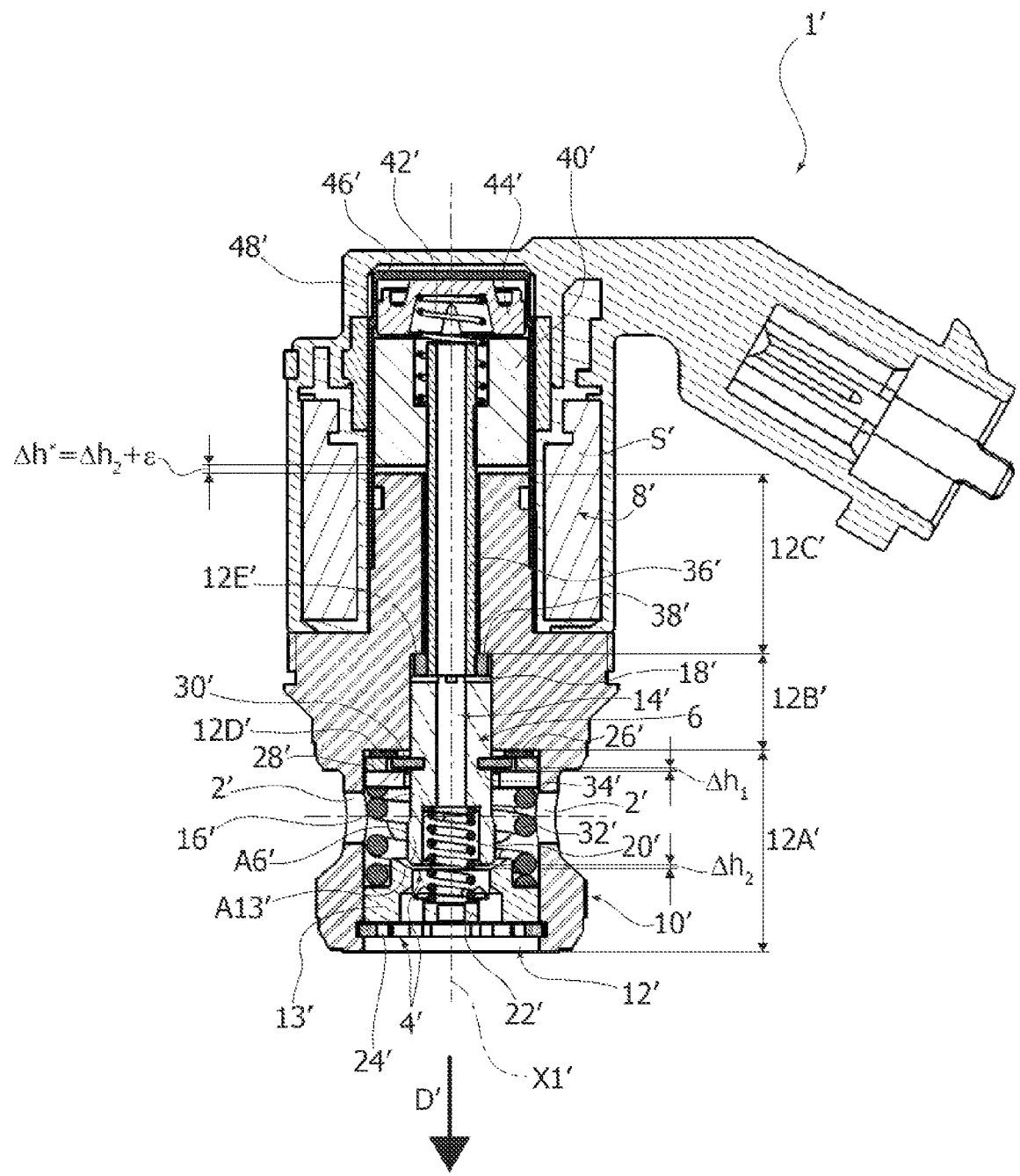
FIG. 8 illustrates a valve according to a further preferred embodiment of the invention.

With reference now to FIG. 8, the reference number 1' designates as a whole an electrically actuated valve according to a preferred embodiment of the invention.

The valve 1' includes a first operative port 2', a second operative port 4', an poppet element 6' configured for governing hydraulic communication between the ports 2', and 4', and an electromagnet 8' configured for actuation of the poppet element 6' along an axis X1' of the valve V.

The valve 1' includes a sleeve 10' having a substantially cylindrical tubular shape, provided on which are the operative ports 2', 4' and mounted axially movable in which is the poppet element 6'. In particular, the port 2' takes the form of a ring of radial holes having an axis incident on the axis X1', whilst the port 4' is defined by the outlet of an axial through hole 12', which shares the axis X1'. In particular, the outlet is obtained through a bushing 13' defined on which is a valve seat A13 having a conical shape on which the poppet element 6' can provide a seal.

The hole 12' includes a first section 12A' having a first diameter, a second section 12B' having a second diameter, and a third section 12C' having a third diameter. The third diameter is smaller than the second diameter, which in turn is smaller than the first diameter, so as to define two shoulders 12D', 12E'.

The poppet element 6' has a generally tubular cylindrical shape and is slidably mounted within the hole 12, guided by the section 12B' (with respect to which it has an identical diameter—but for the clearance necessary for operation) and projecting within the section 12A'.

The poppet element 6' is traversed by an axial through hole 14' having two distinct diameters along its axial development so as to define a shoulder 16'. One end 18' of the poppet element 6' located at the outlet of the section with smaller diameter of the hole 14' has a castellated geometry, whilst at the opposite end a first elastic element 20' is received in the hole 14' with an end bearing upon the shoulder 16'. The second end of the elastic element 20' instead bears upon a hub 22' of the bushing 13'. The axial position of the bushing 13' is determined via a retaining ring (of the circlip type) 24' housed in an annular groove of the sleeve 10' and by the axial position of this annular groove.

Moreover housed within the section 12A' of the hole 12 are:
  a first spacer ring 26', set bearing upon the shoulder 12D;
  a second spacer ring 28' bearing upon the ring 26' and having an internal diameter greater than the internal diameter of the ring 26;
  a third spacer ring 30' bearing upon the ring 28' and having an internal diameter smaller than the internal diameter of the ring 28' and preferentially approximately equal to the internal diameter of the ring 26; and
  a second elastic element 32' having a first end that bears upon the ring 30' (thus compressing the pack of the rings 26', 28', 30') and a second end that bears upon the bushing 13', in particular on a collar thereof.

A retaining ring 34' is housed in an annular groove on the body of the poppet element 6', and is axially movable with the poppet element 6' in the region comprised between the rings 30' and 26'. It should be noted that for this purpose it is necessary for the external diameter of the retaining ring 34' to be smaller than the internal diameter of the ring 28'.

A sleeve element 36' is slidably set in the section 12C' of the hole 12' and is guided thereby; one end of the sleeve element 36' bears upon the castellated end 18', whilst an adjustment ring 38' is fitted around the aforesaid end of the sleeve element 36' and bears upon the shoulder 12E' and the castellated end 18'.

In this way, two axial plays $\Delta h1$ and $\Delta h2$ are defined between the poppet element and other components of the valve 1; namely,
  the play $\Delta h1$ is defined between the retaining ring 34' and the spacer ring 30' (in this regard, note that it is possible for there to be a small axial play also between the retaining ring 34' and the retaining ring 26'); and
  the play $\Delta h2$ is defined between a sealing surface A6' with conical geometry located at the end of the poppet element 6 facing the bushing 13' and the valve seat A13', which also has a conical geometry, and has a width greater than the play $\Delta h1$.

In this connection, it should be noted that the play $\Delta h2$ (maximum displacement of the poppet element 6') is defined via the thickness of the collar-adjustment ring 38', of course having defined the geometry of the poppet element 6' and of the bushing 13', and the axial positions of the shoulder 12E' and of the seat of the retaining ring 24'.

The axial play $\Delta h1$ is, instead, defined by the overall thickness of the rings 26' and 30'. The axial pre-load of the elastic element 32' is, instead, defined by the overall thickness of the rings 26', 28' and 30'.

Fixed, instead, for example with forced fit, to an opposite end of the sleeve element 36' is a movable core 40' of the electromagnet 8', which can be moved axially along the axis X1 by means of a solenoid S' of the electromagnet 8'. The axial stability of the system is ensured by an elastic positioning element designated by the reference number 42', which is comprised between the movable core 40' and a retainer 44', which in turn bears upon the bottom of a cup element 46' fitted on the sleeve 10'. In particular the elastic element 42', by acting on the movable core 40', keeps the sleeve element 36' bearing upon the castellated end 18'.

The electromagnet 8' has a substantially toroidal shape and is fitted on the sleeve 10' substantially in a position corresponding to the cup element 46; it is moreover enclosed in a body 48' in which the electrical connections that carry the current to the solenoid S' are provided.

Finally, it should be noted that in the resting position of the poppet element 6' represented in FIG. 8 there exists an axial play $\Delta h^*$ equal to $\Delta h2+\epsilon$ between the movable core 40' and the sleeve 10, the function of which is to compensate for any possible machining tolerances on the components of the valve 1 and guarantee in any case proper sealing of the poppet element 6' on the valve seat A13', in a way similar to what has already been described (with the use of similar notation) in regard to the valve V. The amount of the axial play $\Delta h^*$ is defined by the axial position where the forced connection (or welding) between the movable core 40' and the sleeve element 36' is obtained. As an alternative, there could be interposed a further adjustment shim, not shown in FIG. 8, between the bottom surface of the movable core 40' and the surface of the ring nut 18'.

Operation the valve 1' is described in what follows.

With reference to FIG. 8, the poppet element 6' is prearranged for providing a seal via the surface A6 on the valve seat A13' set hydraulically between the first operative port 2' and the second operative port 4' and configured for governing hydraulic communication between them. The poppet element 6' can be moved via the electromagnet 8' and is able to assume a first operating position, a second operating position, and a third operating position.

The first operating position of the poppet element 6' is illustrated in FIG. 8 and (schematically) in FIG. 4A (position P1). The first operating position corresponds to a resting condition of the valve 1' and is characterized by the absence of electrical signal at input to the solenoid S'. This implies the substantial absence of electromagnetic force on the movable core 40', which in turn implies the following facts:

- the castellated end 18' of the poppet element 6' is kept bearing upon the adjustment ring 38; it should be noted in this connection that the function of the castellated geometry on the end 18' is to reduce the force of adhesion between the poppet element 6' and the ring 38' caused by the film of fluid that remains trapped between the two facing surfaces;
- between the ring 34' and the ring 30' there exists the axial play $\Delta h1$;
- between the surface A6' and the valve seat A13' there exists the axial play $\Delta h2$;
- the area of passage between the ports 2' and 4' has a maximum value.

In a way similar to the valve 1, the poppet element 6' can be moved from the first operating position illustrated in FIG. 8 to a second operating position by means of a first electrical command imparted on the electromagnet 8', in particular a current that is supplied to the solenoid S'. This results in the development of an electromagnetic force that attracts the movable core 40', causing a displacement (via an action of thrust and not of pull as, instead, occurs in the valve 1) of the poppet element 6' against the resisting action the first elastic element 20'. The transmission of force in the axial direction is possible thanks to the contact between the sleeve element 36' (which basically functions as transmission rod) and the castellated end 18' of the poppet element 6'.

The value of current that is supplied to the solenoid S' is such as to cause a displacement of the poppet element 6' along the axis X1' in a direction indicated by the arrow D' in FIG. 8. This enables an axial displacement to be covered equal to $\Delta h1$ and makes it possible to bring the retaining ring 34' to bear upon the spacer ring 30', thus eliminating the axial play $\Delta h1$ existing in the valve V.

The axial displacement of the poppet element 6' stops against the spacer ring 30' in so far as the value of current supplied to the solenoid S' is chosen so as to be sufficient only to overcome the resisting action the first elastic element 20', but not to overcome a resisting action by an amount equal to the sum of the contributions of force of the first and second elastic elements 20', 32', corresponding to the respective axial pre-loads. Also in this case—as in the valve 1, 100—the elastic elements 20', 32' are mounted so as to have a non-zero deflection at rest and hence likewise a non-zero axial preload. The reasons are, evidently, the same as the ones already described in regard to the valve 1. The continuation of the axial displacement of the poppet element 6 in the direction D' would entail also compression the element 32', as will on the other hand be described shortly in regard to the transition of the poppet element 6' from the second operating position to the third operating position.

As for the valve 1, the two elastic elements, when they are both active in determining the mechanical equilibrium of the system, are set mechanically in parallel since they undergo the same deformation. The displacement of the poppet element 6' that compresses the element 20' is the same that the retaining ring 34' undergoes when it moves the ring 30' compressing the elastic element 32' (the other end of the element 32' is axially fixed in so far as it bears only upon the bushing 13').

In these circumstances, as is known, the equivalent stiffness of the ensemble of elastic elements is equal to the sum of the two contributions.

In the second operating position of the poppet element 6', the area of passage between the ports 2' and 4' is partialized and assumes a value lower than the maximum value.

Basically, in the second operating position a partialization of the area of passage between the ports 2' and 4' is introduced, with consequent modulation of the flow rate of fluid that passes from the port 2' to the port 4'.

Transition of the poppet element 6' from the second operating position to the third operating position is obtained by imparting a second electrical command to the electromagnet 8' by supplying to the solenoid S' a current having a higher intensity than the current imparted in the transition from the first operating position to the second operating position.

This results in a force of attraction on the movable core 40' having a magnitude that is even greater and in particular such as to move the poppet element 6' beyond the position assumed at the end of the transition from the first operating position to the second operating position, overcoming the combined stiffness of the first and second elastic elements 20', 32'. The retaining ring 34 is hence able to draw the ring 30' in the axial direction, thus compressing the elastic element 32'. The displacement of the poppet element 6' stops when the residual axial play between the surface A6' and the seat A13', equal to an amount $\Delta h2-\Delta h1$, is eliminated.

This is equivalent to bringing the surface A6' to bear upon the valve seat A13', which has the result of bringing the area of passage between the port 2' and the port 4' to a substantially zero value so that the first port 2' is isolated from the second port 4' and vice versa (there is in fact allowed a passage of fluid in both directions within the valve 1').

The functional analogy between the two valves 1 and 1' is hence evident; namely,

- in the first operating position of the poppet element, there is a first axial play $\Delta h1$ between a first stop surface of the poppet element (the shoulder 17 in the valve 1, the ring 34' in the valve 1') and a second stop surface, exerted upon which is the action of the second elastic element (the ring 24 for the valve 1, the ring 30' for the valve 1'), and a second axial play $\Delta h2$ between the poppet element 6, 6' and the valve seat A10, A13', with $\Delta h2 > \Delta h1$,
- in the second operating position of the poppet element 6, 6', the first axial play $\Delta h1$ is eliminated; and
- in the third operating position of the poppet element 6, 6', also the second axial play $\Delta h2$ is eliminated.

The analogy clearly also extends to the electrical-actuation device (whatever it is, without being limited to the electromagnet forming the subject of the figures); i.e., a moving element (for example, the movable core 32, 40' in the valves 1, 100, 1') of the electrical-actuation device 8, 8' has a maximum axial displacement $\Delta h^*$ chosen so as to be greater than the value of the second axial play $\Delta h2$ for the reasons set forth above.

For the valve 1' there hence applies what is summed up in the diagrams of FIGS. 6A-C with regard to the valve 1.

It should moreover be noted that, during operation, the pressure of the hydraulic fluid across the valve 1', i.e., the pressure on the port 2' and the pressure on the port 4', has no substantial effect on the movement of the poppet element 6'.

The reason for this is that, thanks to the through hole 14', there always exists the same value of pressure upstream and downstream of the poppet element 6': the hole 14' creates a shortcircuit between the environment onto which the port 4 gives out and the environment where the castellated end 18' is located (amongst other things, the shape of the end 18' is functional for penetration of the working fluid).

Furthermore, the axial through hole of the sleeve 36' and the shape of the movable core 40', which has axial notches, enable the fluid to be at the same pressure both in the volume defined between the castellated end 18' and the adjustment ring 38' and in the volume that houses the movable core 40'.

In other words, the poppet element 6 is hydraulically balanced (there applies the same definition provided previously) along the axis X1': this guarantees that the movement of the poppet element 6' depends only upon the value of excitation current supplied to the solenoid S'.

This is due to the choice of the surfaces of influence on which the action of the pressurized fluid is exerted and of the diameter of dynamic seal (in this case, also guide diameters) of the poppet element 6'.

In particular, the diameter of dynamic seal of the poppet element 6' is the diameter of the section 12B', which is identical to the diameter of the poppet element at the castellated end 18', which moreover corresponds to the diameter on which the surface A6' provides the seal on the valve seat A13'.

Of course, also the valve 1' may be applied, as a replacement of the thermostat 108 (and of the thermostatic valve controlled thereby), within the cooling circuit 100', with operation identical to what has already been described.

As regards possible variants of the valve 1', the same considerations apply as those already expressed regarding the valve 1.

In particular, as has been anticipated, in alternative embodiments the electromagnet 8' may be replaced by a piezoelectric linear actuator or by a magnetostrictive linear actuator, both of which can be controlled electrically.

In the preferred embodiment represented in FIG. 8, the poppet element 6' is countered in its movement along the axis X1' by a first elastic element and a second elastic element having stiffnesses preferentially different from one another. However, the two elastic elements 20', 32' may be sized so as to have identical stiffnesses, which, on the hypothesis of an electromagnet with linear behaviour, would enable amplitudes of current I2 and I1 to be obtained, one of which is twice the other.

Of course, it is possible to choose the stiffnesses in a different way; for example the stiffness of the element 20' may be greater than the stiffness of the element 32', or vice versa.

In other embodiments, it is possible to replace the ensemble of the two elastic elements with a single equivalent elastic element having a nonlinear characteristic. This would be equivalent to sizing the single elastic element so that a deformation thereof from the condition at rest equal to $\Delta h1$ is characterized by a first value of stiffness to deformation, whilst a subsequent deformation of amplitude $\Delta h2 - \Delta h1$ is characterized by a stiffness to deformation greater than the first stiffness so as to reproduce equivalently the mechanical parallel of the elastic elements 20', 32' that characterizes the valve V.

As final consideration—which can be applied to all the embodiments 1, 100, 1'—it is possible to envisage more than one intermediate position. In other words, it is possible to provide the valve 1, 100, 1' as a two-way, three-position valve, where the (second) intermediate position is itself modulable, for example via actuation of the solenoid S, S' with an electrical ramp signal (similar to what is obtained—for example—in electrically actuated proportional valves). It is possible in this way to vary the degree of partialization of the section of passage between the ports 2 and 4 according to the requirements of the application of the valve 1, 1'. In the case described here, this would enable extremely precise control of the flow rate of coolant at input to the engine 102 as a function of the temperature of the coolant itself.

As further consideration, it should be noted that the embodiments of the valve according to the invention presented herein envisage providing a seal between the poppet element and the valve seat of the cone/edge type (valve 1, 100: conical surface A20 on edge A10) or cone/cone type (valve 1': the surface A6' has conical geometry, the seat A13' also presents conical geometry). However, in other embodiments, it is possible to envisage a seal of the ball/cone type, where the spherical geometry would be assigned to the poppet element.

In the engine according to the invention, the control valve described above, which has at least three operating positions, enables adjustment of the rate at which the pressure chamber C is emptied when this is connected to discharge, which consequently regulates the speed at which the intake valve returns into the closed position following upon the aforesaid emptying of the pressure chamber.

When the speed of closing of the intake valves after decoupling from the cam has to be relatively lower, the pressure chamber is emptied by bringing the control valve into its second position, in which it is only partially open. When, instead, the speed of closing of the intake valves can be relatively higher, the pressure chamber is emptied by bringing the control valve into its first, completely open, position.

Consequently, in the stages in which the pressure chamber of the system is connected to discharge for uncoupling the intake valves from the respective cams, the rate at which the pressure chamber is emptied of the working fluid can be higher or lower according to whether the control valve is brought into its completely open position or into the partially open position. It is thus possible in particular to select the partially open position in the conditions (for example, at partial engine loads) in which it is necessary to obtain a slower movement of closing of the intake valves so as to keep the noise of the system down to a minimum.

More in general, the present invention enables a movement of closing of the intake valves after decoupling from the respective control cam according to a speed that is adjustable.

Figure 9:
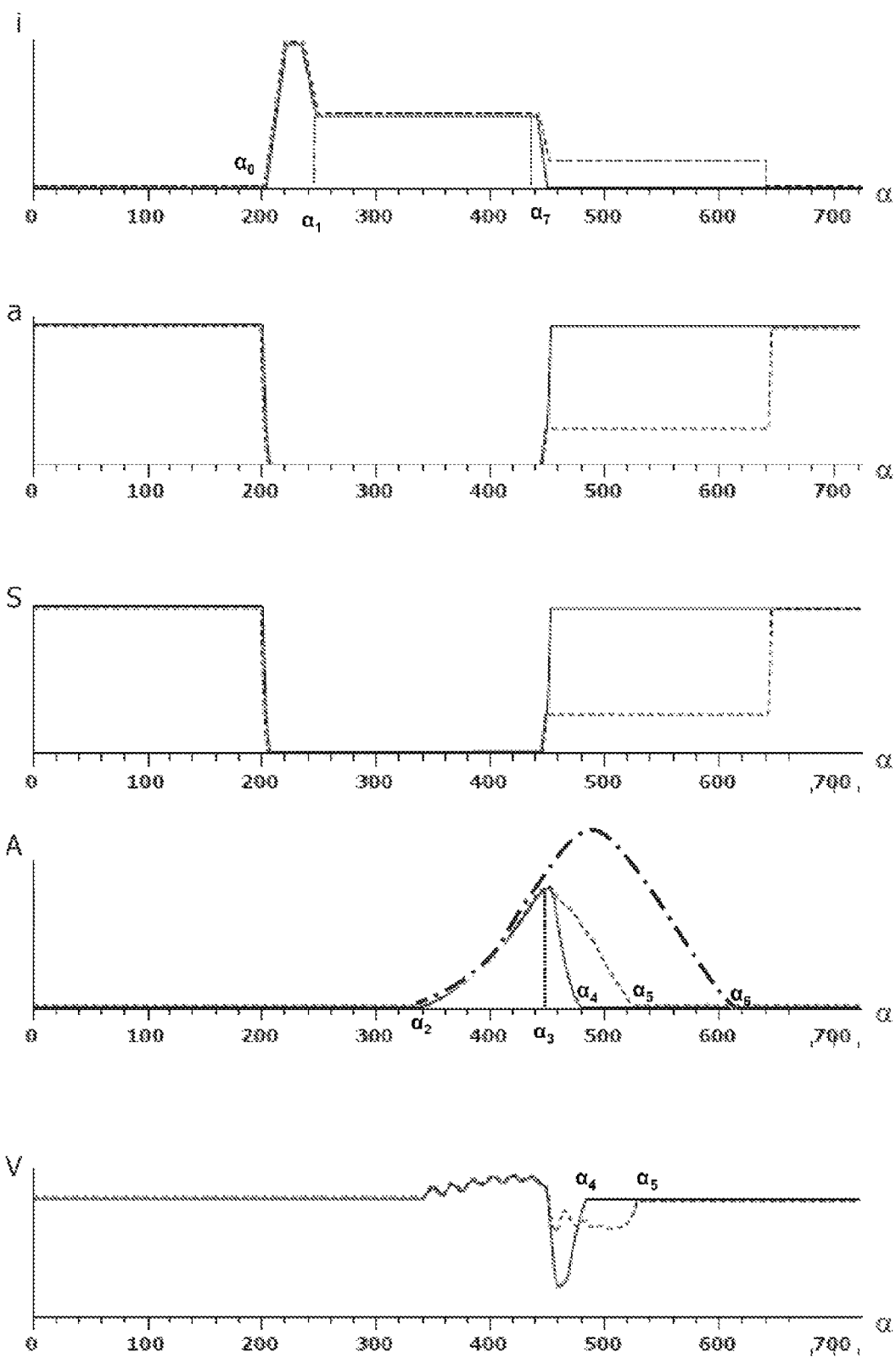
FIG. 9 shows further diagrams that illustrate operation of the engine according to the invention.

FIG. 9 of the annexed drawings shows the evolution of some of the quantities that control motion of the intake valves in an operating condition of the engine that requires advanced closing of at least one of the two intake valves by decoupling from the respective cam. FIG. 9 shows, as a function of the engine angle, the following plots (from top down in the figure):

the plot of the variation of the electric current "i" of supply of the solenoid of the valve 1;

the plot of the displacement "a" of the poppet element of the valve 1;

the plot of the variation of the section of passage "S" through the valve;

the plot of the lift "A" of the intake valve (where in particular there has been added a dashed and dotted curve $\alpha_2 - \alpha_6$ that represents the lift of the intake valves if the valve 1 remains closed, i.e., in the case of "full load"); and the plot of the speed "V" of movement of the intake valve.

In these plots, the solid line corresponds to an operating mode where the valve 1 is switched between the completely closed position (where the intake valve "senses" the respective control cam—section $\alpha_2 - \alpha_3$), and a completely open position, of fast emptying of the pressure chamber that determines closing of the intake valve at the angular position $\alpha_4$.

The dashed line indicates, instead, an operating mode where the valve 1 is switched between the completely closed position (where the intake valve "senses" the respective control cam—section $\alpha_2$-$\alpha_3$), and a position where it is only partially open, of slower emptying of the pressure chamber, which determines closing of the intake valve at the angular position $\alpha_5$. The electronic control unit selects this second mode of operation in the stages where it is necessary to reduce the speed of closing of the intake valve, for example at partial engine loads, for example for reducing or eliminating the noise of the system.

The first plot at the top in FIG. 9 shows an example where, according to a technique in itself known, when the valve 1 is to be brought into the completely closed position a current signal is issued (angular position $\alpha_0$) that comprises an initial peak value, so as to obtain quickly displacement of the poppet element, and a subsequent lower value, where the poppet element of the valve is kept in the completely closed position (angular position $\alpha_1$). In the same diagram, represented by $\alpha_7$, i.e., with a slight advance with respect to the angular position $\alpha_3$ where start of closing of the intake valve is desired, is the angular position at which switching of the valve 1 to the position 2 or to the position 1 is obtained.

In general, in the engine according to the invention the selection between said first, completely open, position and said second, only partially open, position is made as a function of one or more of the following parameters: engine r.p.m., engine load, a value of temperature of the engine, the temperature of the fluid used in the hydraulic system for actuation of the intake valves, and the viscosity of the aforesaid fluid.

Naturally, the details of construction and the embodiments of the system for variable control of the intake valves may vary widely with respect to what has been described above purely by way of example.

What is claimed is:

1. An internal-combustion engine, comprising for each cylinder of the engine:
    a combustion chamber;
    at least one intake duct and at least one exhaust duct opening out into said combustion chamber;
    at least one intake valve and at least one exhaust valve associated to said intake and exhaust ducts and provided with respective return springs that push the at least one intake valve and the at least one exhaust valve toward a closed position; and
    a camshaft for actuating the intake valves by means of respective tappets;
    wherein said at least one intake valve is governed by a respective tappet of the tappets against an action of the return spring by interposition of hydraulic means including a pressurized-fluid chamber, facing which is a pumping plunger connected to the respective tappet of the valve, said pressurized-fluid chamber being capable of communicating with a chamber of a hydraulic actuator associated to said at least one intake valve;
    a single electrically actuated control valve associated to said at least one intake valve of each cylinder and capable of setting said pressurized-fluid chamber in communication with a discharge channel in order to uncouple said at least one intake valve from the respective tappet and cause rapid closing of said at least one intake valve by action of the respective return spring;
    electronic control means, for controlling said control valve to vary an instant of opening and/or the instant of closing and a lift of each intake valve as a function of one or more operating parameters of the engine,
    the electrically actuated control valve associated to each cylinder being a two-way valve having at least three different operating positions, comprising:
    a first operating position in which the control valve is completely open;
    a second operating position in which the control valve is only partially open; and
    a third operating position in which the control valve is completely closed, and
    said electronic control means programmed for:
    keeping said control valve in said third, completely closed, position in operating stages in which said at least one intake valve must remain coupled to the respective cam,
    bringing said control valve from said third, completely closed, position to said second, partially open, position or to said first, completely open, position in operating stages in which said at least one intake valve must be uncoupled from the respective cam, the selection between said first position and said second position of the control valve being made as a function of one or more operating parameters of the engine.

2. The engine according to claim 1, wherein selection between said first position and said second position is made as a function of one or more of the following parameters: engine r.p.m., engine load, a value of temperature of the engine, a temperature of a fluid used in said hydraulic means, a viscosity of said fluid.

3. The engine according to claim 1, wherein:
    said electrically actuated control valve includes a first operative port, a second operative port, a poppet element co-operating with a valve seat set hydraulically between the first operative port and the second operative port, and an electrical-actuation device for displacing the poppet element between a first operating position, a second operating position, and a third operating position, corresponding to the operating positions of the control valve,
    wherein:
    in the first operating position, an area of passage for a hydraulic fluid defined between said valve seat and said poppet element has a maximum value;
    in the second operating position, said area of passage is partialized and has a value lower than said maximum value;
    in the third operating position, said poppet element is in contact with said valve seat and the area of passage has a substantially zero value, so that the first operative port is isolated from the second operative port,
    wherein:
    the poppet element is moveable from the first operating position to the second operating position by a first electrical command imparted on said electrical-actuation device against the resisting action a first elastic element,
    the poppet element is movable from the second operating position to the third operating position by a second electrical command imparted on said electrical-actuation device against the resisting action said first elastic element and of a second elastic element.

4. The engine according to claim 3, wherein said poppet element is movable along a main axis of said valve and is set coaxially thereto.

5. The engine according to either claim 3, wherein said poppet element is hydraulically balanced.

6. The engine according to claim 3, wherein said first elastic element and said second elastic element have different stiffnesses.

7. The engine according to claim 3, wherein said electrical-actuation device is an electromagnet and in that said first and second electrical commands correspond to two different levels of the supply current of the electromagnet.

8. The engine according to claim 7, wherein said control valve further includes a second spacer ring bearing upon said elastic positioning ring and in turn having a stop surface for a movable core of said electromagnet, said movable core being axially constrained to said shank and being able to slide in a cavity within which said first elastic element is housed, bearing upon the shank.

9. The engine according to claim 3, wherein said electrical-actuation device includes a piezoelectric linear actuator.

10. The engine according to claim 3, wherein said electrical-actuation device includes a magnetostrictive linear actuator.

11. The engine according to any claim 1, wherein said first elastic element and said second elastic element have identical stiffnesses.

12. The engine according to claim 1, wherein said control valve includes a body having a cylindrical tubular shape, provided on which are said first operative port and said second operative port and mounted axially movable within which is said poppet element, wherein said electrical-actuation device is fixed to said body.

13. The engine according to claim 12, wherein said poppet element includes a head and a shank, wherein the head is slidably mounted within a first section of a through hole of said body having a first diameter, and said shank traverses a second section of said through hole of said body.

14. The engine according to claim 13, wherein housed in said second section of said axial hole of the body are:
- a first spacer ring bearing upon a shoulder between said first section and said second section of the through hole; and
- said second elastic element bearing upon said first spacer ring and upon an axially fixed elastic positioning ring.

\* \* \* \* \*